United States Patent
Ko et al.

(10) Patent No.: US 8,929,216 B2
(45) Date of Patent: *Jan. 6, 2015

(54) PACKET SCHEDULING METHOD AND APPARATUS BASED ON FAIR BANDWIDTH ALLOCATION

(75) Inventors: Nam-Seok Ko, Daejeon-si (KR);
Jong-Dae Park, Daejeon-si (KR);
Byung-Ho Yae, Daejeon-si (KR);
Sung-Kee Noh, Daejeon-si (KR);
Woo-Sug Jung, Daejeon-si (KR);
Sung-Jin Moon, Daejeon-si (KR);
Hwan-Jo Heo, Daejeon-si (KR);
Soon-Seok Lee, Daejeon-si (KR)

(73) Assignee: Electronics and Telecommunications Research Institute, Daejeon-si (KR)

(*) Notice: Subject to any disclaimer, the term of this patent is extended or adjusted under 35 U.S.C. 154(b) by 516 days.

This patent is subject to a terminal disclaimer.

(21) Appl. No.: 13/301,350

(22) Filed: Nov. 21, 2011

(65) Prior Publication Data
US 2012/0127859 A1    May 24, 2012

(30) Foreign Application Priority Data
Nov. 24, 2010    (KR) .................. 10-2010-0117408

(51) Int. Cl.
*H04L 12/26* (2006.01)
*H04L 12/873* (2013.01)
*H04L 12/875* (2013.01)
*H04L 12/869* (2013.01)
*H04L 12/867* (2013.01)

(52) U.S. Cl.
CPC ............. *H04L 47/52* (2013.01); *H04L 47/568* (2013.01); *H04L 47/58* (2013.01); *H04L 47/629* (2013.01)

USPC ........... 370/232; 370/412; 370/231; 370/428; 709/234

(58) Field of Classification Search
None
See application file for complete search history.

(56) References Cited

U.S. PATENT DOCUMENTS

| | | | | |
|---|---|---|---|---|
| 5,668,797 | A | * | 9/1997 | Fahmi et al. .................. 370/229 |
| 5,930,234 | A | * | 7/1999 | Yoshida ........................ 370/232 |
| 6,011,775 | A | * | 1/2000 | Bonomi et al. ............... 370/230 |
| 6,023,468 | A | * | 2/2000 | Mouen-Makoua et al. .......................... 370/395.43 |
| 6,094,418 | A | * | 7/2000 | Soumiya et al. .............. 370/231 |
| 6,101,193 | A | | 8/2000 | Ohba |
| 6,108,303 | A | * | 8/2000 | Fahmi et al. .................. 370/230 |
| 6,353,618 | B1 | * | 3/2002 | Hung et al. ................... 370/459 |
| 6,381,214 | B1 | * | 4/2002 | Prasad ........................ 370/230.1 |
| 6,553,424 | B1 | * | 4/2003 | Kranz et al. .................. 709/234 |
| 6,563,796 | B1 | * | 5/2003 | Saito ............................ 370/252 |

(Continued)

*Primary Examiner* — Ian N Moore
*Assistant Examiner* — Dung B Huynh
(74) *Attorney, Agent, or Firm* — Nelson Mullins Riley & Scarborough LLP; Anthony A. Laurentano, Esq.; Lewis Lee, Esq.

(57) ABSTRACT

A packet scheduling method and apparatus which allows multiple flows that require data transmission to the same output port of a network device such as a router to fairly share bandwidth. The packet scheduling method includes calculating an expected time of arrival of a (k+1)-th packet subsequent to a currently input k-th packet of individual flows by use of bandwidth allocated fairly to each of the flows and a length of the k-th packet; in response to the arrival of the (k+1)-th packet, comparing the expected time of arrival of the (k+1)-th packet to an actual time of arrival of the (k+1)-th packet; and scheduling the (k+1)-th packet of each flow according to the comparison result.

16 Claims, 3 Drawing Sheets

(56) References Cited

U.S. PATENT DOCUMENTS

| | | | |
|---|---|---|---|
| 6,707,821 B1 * | 3/2004 | Shaffer et al. | 370/395.4 |
| 6,724,726 B1 * | 4/2004 | Coudreuse | 370/235 |
| 6,754,182 B1 * | 6/2004 | Aznar et al. | 370/252 |
| 6,795,452 B2 * | 9/2004 | Iancu | 370/515 |
| 6,810,031 B1 * | 10/2004 | Hegde et al. | 370/351 |
| 6,917,589 B2 * | 7/2005 | Berenbaum | 370/232 |
| 7,461,159 B2 | 12/2008 | Tayyar et al. | |
| 7,477,596 B1 * | 1/2009 | Burch et al. | 370/229 |
| 8,660,001 B2 * | 2/2014 | Ko et al. | 370/232 |
| 2002/0097679 A1 * | 7/2002 | Berenbaum | 370/232 |
| 2003/0128667 A1 * | 7/2003 | Matsufuru | 370/230.1 |
| 2005/0002481 A1 * | 1/2005 | Woo et al. | 375/354 |
| 2005/0147037 A1 * | 7/2005 | Maimon et al. | 370/230 |
| 2005/0249115 A1 * | 11/2005 | Toda et al. | 370/229 |
| 2007/0019552 A1 * | 1/2007 | Senarath et al. | 370/235 |
| 2007/0147422 A1 * | 6/2007 | Urano et al. | 370/468 |
| 2010/0074198 A1 * | 3/2010 | Morioka | 370/329 |
| 2012/0127858 A1 * | 5/2012 | Ko et al. | 370/232 |
| 2013/0051286 A1 * | 2/2013 | Schultz et al. | 370/278 |

* cited by examiner

PACKET SCHEDULING METHOD AND APPARATUS BASED ON FAIR BANDWIDTH ALLOCATION

CROSS-REFERENCE TO RELATED APPLICATION(S)

This application claims the benefit under 35 U.S.C. §119 (a) of Korean Patent Application No. 10-2010-0117408, filed on Nov. 24, 2010, in the Korean Intellectual Property Office, the entire disclosure of which is incorporated herein by reference for all purposes.

BACKGROUND

1. Field

The following description relates to a packet scheduling, and more particularly, to a packet scheduling method and apparatus which allows multiple flows that require data transmission to the same output port of a network device such as a router to fairly share bandwidth.

2. Description of the Related Art

With the advent of diverse application services and increase of users, various methods including call admission control, buffer management, packet scheduling, congestion control, quality of service (QoS) routing, and the like have been researched to provide QoS in a network.

Packet scheduling is applied in various forms to a network device to guarantee network performance. A weighted fair queuing (WFQ) algorithm and a fair queuing (FQ) algorithm similar to WFQ which introduce virtual time and calculate a virtual start time and a virtual termination time of each packet allocate the calculated virtual start time or the calculated virtual termination time to a packet as a timestamp, and perform packet scheduling according to an arrangement based on the timestamp value. Thus, the WFQ and FQ algorithms have a complexity of O(logN) when there are present N flows.

On the other hand, in other packet scheduling methods such as stop-end-go or hierarchical-round-Robin, which divide a time axis frame-by-frame and perform packet scheduling based on a frame at which a packet arrives, system performance is substantially affected by a frame size, and inter-frame synchronization is required, which makes it difficult to apply the method to a large-scale network.

SUMMARY

The following description relates to a packet scheduling method, which fairly allocates network bandwidth among flows, and controls traffic of each flow using an expected time of arrival of a packet in each allocated bandwidth, thereby allowing the flows to use only their fair share of network bandwidth.

In one general aspect, there is provided a packet scheduling method including: calculating an expected time of arrival of a (k+1)-th packet subsequent to a currently input k-th packet of individual flows by use of bandwidth allocated fairly to each of the flows and a length of the k-th packet; in response to the arrival of the (k+1)-th packet, comparing the expected time of arrival of the (k+1)-th packet to an actual time of arrival of the (k+1)-th packet; and scheduling the (k+1)-th packet of each flow according to the comparison result.

The comparing of the expected time of arrival of the (k+1)-th packet to the actual time of arrival of the (k+1)-th packet may include comparing the expected time of arrival of the (k+1)-th packet to the sum of the actual time of arrival of the (k+1)-th packet and a burst tolerance time.

The scheduling of the (k+1)-th packet of each flow according to the comparison result may include discarding the (k+1)-th packet if the expected time of arrival of the (k+1)-th packet of each flow is later than the sum of the actual time of arrival of the (k+1)-th packet and a burst tolerance time.

The scheduling of the (k+1)-th packet of each flow according to the comparison result may include comparing the expected time of arrival of the (k+1)-th packet to a time obtained by subtracting a "rearrangement limit time" for the expected time of arrival from the actual time of arrival of the (k+1)-th if the expected time of arrival of the (k+1)-th packet of each flow is not later than the sum of the actual time of arrival of the (k+1)-th packet and the burst tolerance time.

The scheduling of the (k+1)-th packet of each flow may include initializing the expected time of arrival of the (k+1)-th packet to the actual time of arrival of the (k+1)-th packet if the expected time of arrival of the (k+1)-th packet is earlier than the time obtained by subtracting the "rearrangement limit time" for the expected time of arrival from the actual time of arrival of the (k+1)-th, and calculating an expected time of arrival of the (k+2)-th packet subsequent to the (k+1)-th packet based on the calculated expected time of arrival of the (k+1)-th packet if the expected time of arrival of the (k+1)-th packet is not earlier than the time obtained by subtracting the "rearrangement limit time" from the actual time of arrival of the (k+1)-th packet.

Each of the flows may be allocated bandwidth which is resulted from dividing total output link capacity by the number of all flows that share the link. The packet scheduling method may further include fairly distributing bandwidth that is allocated to the flows but not used to all flows that share the output link.

The calculating of the expected time of arrival of the (k+1)-th packet may include calculating the expected time of arrival of the (k+1)-th packet by adding an expected time of arrival of the k-th packet and a value obtained by dividing the length of the k-th packet by the bandwidth allocated to the flow of the k-th packet.

The packet scheduling method may further include: generating flow information with respect to an input packet and adding the flow information in a flow information storage unit when a flow of the input packet is a new flow whose flow information is not found in the flow information storage unit for storing information of at least one flow; setting an expected time of arrival of the input packet to an actual time of arrival of the input packet; and calculating an expected time of arrival of a subsequent packet of the new flow using the set expected time of arrival.

In another general aspect, there is provided a packet scheduling apparatus including: an expected time of arrival calculating unit configured to calculate an expected time of arrival of a (k+1)-th packet subsequent to a currently input k-th packet of individual flows by use of bandwidth allocated fairly to each of the flows and a length of the k-th packet; and a packet scheduling unit configured to compare the expected time of arrival of the (k+1)-th packet to an actual time of arrival of the (k+1)-th packet in response to the arrival of the (k+1)-th packet and to schedule the (k+1)-th packet of each flow according to the comparison result.

Other features and aspects may be apparent from the following detailed description, the drawings, and the claims.

Figure 1:
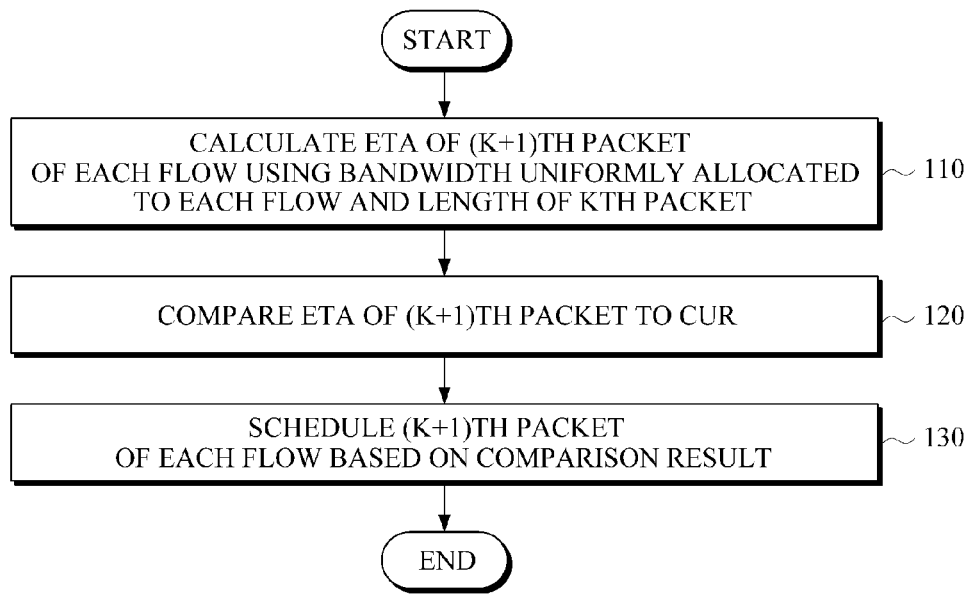
FIG. 1 is a flowchart illustrating an example of a packet scheduling method based on an estimated time of arrival (ETA) of a packet.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates a flowchart of a packet scheduling method based on an estimated time of arrival (ETA) of a packet.

Packet scheduling method based on fair bandwidth allocation which will be described hereinafter allows a number of data traffic flows that require data transmission to the same output port of a network device such as a router to fairly share bandwidth. A data traffic flow (hereinafter, referred to as a 'flow') may be defined as a series of packets which may be grouped together according to the same combination of the field(s) extracted from data packet header. For example, a series of packets having the same source IP address, the same destination IP address, the same protocol value, the same TCT/UDP source port number, or the same TCT/UDP destination port number may be defined as a flow. In cases, a flow may be defined based on a single source IP address field.

For packet scheduling among flows, a flow information storage unit (not illustrated) is used to store information of each flow. The flow information storage unit may consist of memory blocks for each flow. Each memory block for the flow may store, maintain, and update characteristics and change of status of the flow including flow forwarding information and scheduling processing information. For example, the memory block for the flow may store QoS requirements including QoS type, bandwidth allocated to the flow, and the like and status information for packet scheduling.

Referring to FIG. 1, in a case where bandwidth is allocated fairly to flows, packet scheduling is performed by calculating an expected time of arrival (ETA) of a (k+1)-th packet to be input to each flow based on the fairly allocated bandwidth and a length of a k-th packet that is currently input to each flow in 110.

Then, the ETA of the (k+1)-th packet of each flow is compared to an actual time of arrival (denoted as "CUR" in drawings) of the (k+1)-th packet in 120. For example, the calculated ETA of the (k+1)-th packet may be compared with the CUR of the (k+1)-th packet in consideration of burst tolerance BT, which is allowed time for a burst of packets.

In 130, the (k+1)-th packet may be scheduled to be transmitted based on the result of the comparison performed in 120. The ETA of the (k+1)-th packet of a given flow is compared to the sum of the actual time of arrival CUR of the (k+1)-th packet and BT, and if the ETA is later than the sum of the CUR and BT, the (k+1)-th packet may be regarded as not being transmitted over the fairly allocated bandwidth and thus can be discarded.

If the (k+1)-th packet arrives later than the ETA or at the ETA, the packet can be scheduled and transmitted. The scheduling method shown in FIG. 1 may include additional packet processing procedures according to practical implementation.

Bandwidth $BW_i$ which is allocated fairly to each flow i may be obtained as described below.

Excluding bandwidth for different purposes of use among bandwidth of an output link of a packet, the total bandwidth that can be fairly distributed to all flows that share the output link is assumed as $BW_t$. In this case, a minimum bandwidth $BW_{min}^i$ which is guaranteed to a given flow i may be obtained as $BW_{min}^i = BW_t/N$ in consideration of the number N of flows that share the total bandwidth $BW_t$.

In a case of $$\sum_{i=1}^{N} BW_{min}^i < BW_t,$$

that is, in a case where some flows among the total N flows are using bandwidth narrower than the minimum bandwidth $BW_{min}^i$ and thus the bandwidth $BW_u$ practically in use is narrower than the total bandwidth $BW_t$, the originally allocated bandwidth may be adjusted for improving use efficiency in such a manner that the unused bandwidth $BW_t - BW_u$ can be fairly used by the remaining flows.

To this end, $(BW_t - BW_u)/N$ may be additionally allocated to each of the N flows. According to these procedures, bandwidth $BW_i$ to be practically allocated to each flow may be adjusted to $BW_{min}^i + (BW_t - BW_u)/N$.

Figure 2:
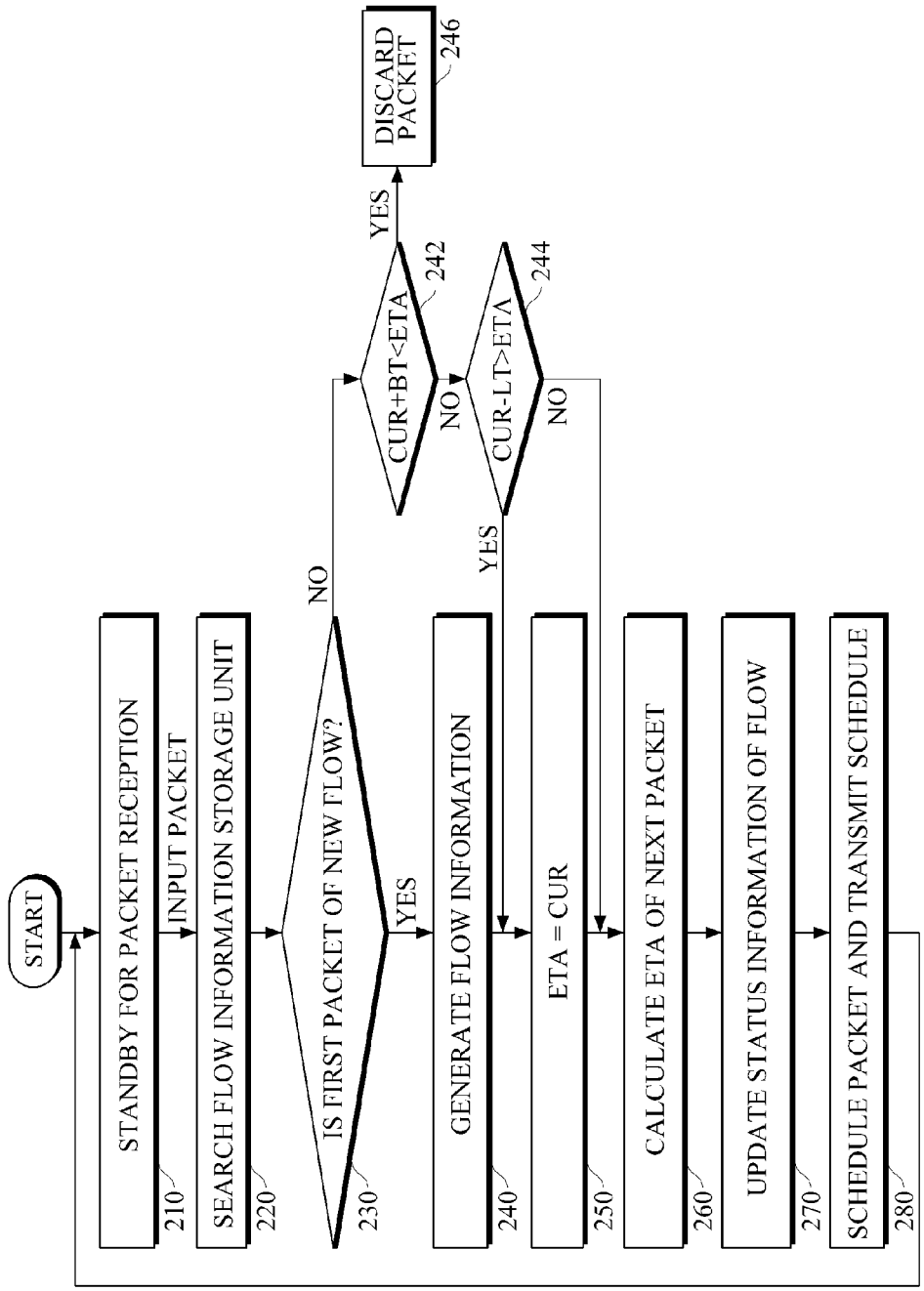
FIG. 2 is a flowchart showing in further detail the packet scheduling method based on ETA of a packet shown in FIG. 1.

FIG. 2 illustrates a flowchart showing in further detail the packet scheduling method based on ETA of a packet shown in FIG. 1.

In standby for packet reception in 210, once a packet is input, the flow information storage unit is searched through in 220.

In 230, a determination is made as to whether the input packet is a non-first packet of an existing flow whose flow information is already generated in the flow information storage unit or a first packet of a new flow whose flow information is yet to be generated in the flow information storage unit.

For example, the input packet may be a k-th packet, among a plurality of packets of an i-th flow that are sequentially received without any data loss. In this example, an ETA of the k-th packet $ETA_i^k$, which is stored in the flow information storage unit, may be compared with a CUR of the k-th packet. The CUR of the k-th packet may correspond to a system clock time of a packet scheduling apparatus that performs the example illustrated in FIG. 2.

The ETA $ETA_i^k$ may be calculated using Equation (1):

$$ETA_i^k = ETA_i^{k-1} + \frac{L_i^{k-1}}{BW_i} \quad (1)$$

where $BW_i$ indicates bandwidth fairly allocated to the i-th flow upon the receipt of a (k−1)-th packet, $ETA_i^{k-1}$ indicates an ETA of the (k−1)-th packet, and $L_i^{k-1}$ indicates the length of the (k−1)-th packet.

The expected time of arrival $ETA_i^k$ of the continuous k-th packet of the i-th flow is compared to the sum of the actual time of arrival CUR of the k-th packet and the burst tolerance time (BT) in consideration of burst tolerance or BT. By doing so, it may be determined in 242 whether the k-th packet exceeds BT and is input earlier. The burst tolerance BT may be set to a predetermined value including zero according to the circumstances of a network.

If the expected time of arrival $ETA_i^k$ of the k-th packet is later than the sum (CUR+BT) of the actual time of arrival CUR and the BT in 242, the k-th packet is a packet that exceeds the BT and thus can be discarded in 246.

If the expected time of arrival $ETA_i^k$ of the k-th packet is equal to or earlier than the sum (CUR+BT) of the actual time of arrival CUR and the BT in 244, the expected time of arrival $ETA_i^k$ of the k-th packet is compared with a time obtained by subtracting a limited time LT for rearranging the ETA (hereinafter, it will be referred to as an ETA "rearrangement limit time" LT) from the actual time of arrival CUR of the k-th packet. According to the comparison result, it is determined whether the k-th packet exceeds the ETA "rearrangement limit time" LT and thus the actual time of arrival CUR is delayed than the expected time of arrival $ETA_i^k$ in 244. The ETA "rearrangement limit time" LT may be set according to the circumstances of a network.

If the expected time of arrival $ETA_i^k$ of the k-th packet is earlier than a time (CUR-LT) obtained by subtracting the ETA "rearrangement limit time" LT from the actual time of arrival of the k-th packet in 244, it appears that the k-th packet has arrived more than the ETA "rearrangement limit time" LT later than the ETA $ETA_i^k$, and thus the relevant flow of the k-th packet is reset to a current system clock to prevent the difference between the ETA of the flow and the system clock from continuing to increase. For example, the expected time of arrival $ETA_i^k$ of the k-th packet may be initialized to the actual time of arrival CUR of the k-th packet in 250.

Thereafter, in 260, an expected time of arrival $ETA_i^{k+1}$ of the (k+1)-th packet of the i-th flow is calculated using Equation (2):

$$ETA_i^{k+1} = ETA_i^k + \frac{L_i^k}{BW_i} \qquad (2)$$

where $L_i^k$ indicates the length of the k-th packet.

In 270, the ETA $ETA_i^{k+1}$ calculated in 260 is stored in the flow information storage unit to update flow status information corresponding to the i-th flow. In 280, the k-th packet is scheduled to be transmitted based on the ETA $ETA_i^k$ that is initialized to the CUR of the k-th packet.

If the expected time of arrival $ETA_i^k$ of the k-th packet is later than or equal to the time obtained by subtracting the ETA "rearrangement limit time" LT from the CUR of the k-th packet in 244, it is considered that the k-th packet has arrived later than the expected time of arrival $ETA_i^k$ but does not exceed the "rearrangement limit time" LT. In this case, the expected time of arrival $ETA_i^k$ of the (k+1)-th packet may be calculated using Equation (2) in consideration of the length $L_i^k$ of the k-th packet of the i-th flow in 260. In 270, the flow status information corresponding to the i-th flow is updated with the expected time of arrival $ETA_i^{k+1}$ of the (k+1)-th packet in the flow information storage unit. In 280, the k-th packet may be scheduled to be transmitted based on its expected time of arrival $ETA_i^k$.

In 240, in response to the input packet being a first packet of a new flow, e.g., a j-th flow, flow information corresponding to the input packet is generated and is added to the flow information storage unit. Bandwidth $BW_j$ to be allocated to the j-th flow may be calculated. The bandwidth $BW_j$ may be determined by dividing total bandwidth $BW_t$ by a total number N of flows (including the j-th flow) that share an output link. Accordingly, it is possible to fairly share the total bandwidth $BW_t$ between the flows that share an output link.

The expected time of arrival $ETA_j^1$ of the j-th flow is initialized to a current system clock time that is a packet arrival time CUR ($ETA_j^1$=CUR) in 250.

In 260, an expected time of arrival $ETA_j^2$ of a second packet of the j-th flow is calculated using Equation (3):

$$ETA_j^2 = ETA_j^1 + \frac{L_j^1}{BW_j} \qquad (3)$$

where $L_j^1$ indicates the length of the first packet of the j-th flow.

In 270, the ETA $ETA_j^2$ is updated in a memory block of the flow information storage unit corresponding to the j-th flow. In 280, the first packet of the j-th flow is scheduled to be transmitted based on the ETA $ETA_j^1$ that is initialized.

Figure 3:
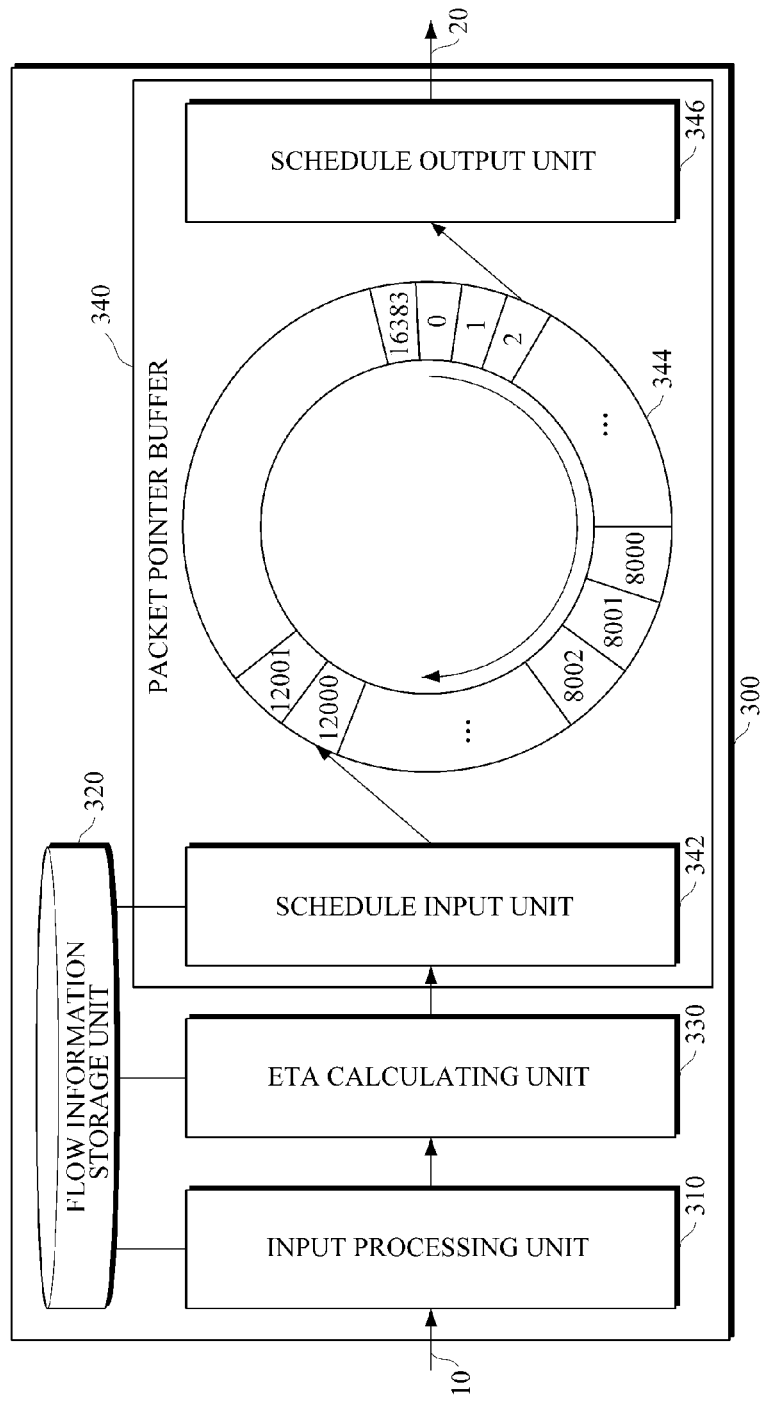
FIG. 3 is a diagram illustrating an example of a packet scheduling apparatus that performs the fair bandwidth allocation-based packet scheduling method using an expected time of arrival of a packet as shown in the example illustrated in FIG. 1.

FIG. 3 illustrates an example of a packet scheduling apparatus that performs the fair bandwidth allocation-based packet scheduling method using an expected time of arrival of a packet as shown in the example illustrated in FIG. 1.

The packet scheduling apparatus 300 may include an input processing unit 310, a flow information storage unit 320, an ETA calculating unit 330, and a packet scheduling unit 340. The packet scheduling apparatus 300 may be implemented as various network devices such as a router, an L3 switch, or the like.

The packet scheduling apparatus 300 may receive a packet through an input link 10, and output a scheduled packet through an output link 20.

The input processing unit 310 may receive the packet, generate flow information with respect to the input packet, and store the flow information in the flow information storage unit 320. The input processing unit 310 may search the flow information storage unit 320 for flow information and update and manage the flow information storage unit 320.

The input processing unit 310 may determine whether the flow information with respect to the input packet is found in the flow information storage unit 320 that stores information about at least one flow. The input processing unit 310 may generate flow information with respect to the input packet and add it to the flow information storage unit 320 if the flow information involved with the input packet is new information that is not found in the flow information storage unit 320.

The flow information storage unit 320 may store, maintain and/or update various features of flows or change in status of flows, which includes forwarding information and scheduling processing information of flows. The flow information storage unit 320 may store an expected time of arrival (ETA) of a subsequent packet of each flow that is calculated by the ETA calculating unit 330. Hereinafter, it is assumed that a currently input packet is the k-th packet and a subsequently input packet is the (k+1)-th packet.

The ETA calculating unit 330 may use bandwidth allocated fairly to each flow and a length of the currently input packet, i.e., the k-th packet, to calculate an ETA of the subsequently input packet, i.e., the (k+1)-th packet of each flow. The ETA calculating unit 330 may obtain the ETA of the (k+1)-th packet by adding a value from dividing the length of the k-th packet by bandwidth allocated to the flow to the ETA of the k-th packet.

The ETA calculating unit 330 may manage bandwidth usage rates of the input link 10 and the output link 20. The ETA calculating unit 330 may fairly distribute bandwidth that is unused while allocated to the output link 20 to all flows that share the output link 20. The number of flows that share the output link 20 may correspond to the number of all flows that are managed by the flow information storage unit 320.

The packet scheduling unit 340 may compare the ETA of a packet of each flow to an actual time of arrival of the packet, and schedule a subsequent packet of each flow based on the comparison result. Upon arrival of the (k+1)-th packet, the packet scheduling unit 340 may compare the ETA of the (k+1)-th packet and the actual time of arrival of the (k+1)-th packet, and schedule the (k+1)-th packet based on the comparison result. The packet scheduling unit 340 may include a scheduling input unit 342, a packet pointer buffer 344, and a schedule output unit 346.

The schedule input unit 342 may allocate one or more packets to the packet pointer buffer 344 according to the calculated ETA. The schedule input unit 342 may allocate one or more packets to a plurality of time slots in the packet pointer buffer 344 allocated according to the ETA of each packet.

If the input packet is not the first packet of each flow, the schedule input unit 342 may compare the ETA of the (k+1)-th packet to the sum of the actual time of arrival CUR of the (k+1)-th packet and burst tolerance time BT. The schedule input unit 342 may discard the (k+1)-th packet of each flow if the ETA of the (k+1)-th packet is later than the sum of the actual time of arrival CUR of the (k+1)-th packet and the burst tolerance time BT.

Moreover, the schedule input unit 342 may compare the ETA of the (k+1)-th packet of each flow to the time obtained by subtracting a "rearrangement limit time" LT for the ETA from the actual time of arrival CUR of the (k+1)-th packet if the ETA of the (k+1)-th packet is not later than the sum of the actual time of arrival CUR of the (k+1)-th packet and the burst tolerance time BT.

The schedule input unit 342 may initialize the ETA of the (k+1)-th packet to the actual time of arrival CUR of the (k+1)-th packet if the ETA of the (k+1)-th packet is earlier than the time obtained by subtracting the "rearrangement limit time" LT from the actual time of arrival CUR of the (k+1)-th packet.

The schedule input unit 342 may calculate an ETA of the (k+2)-th packet subsequent to the (k+1)-th packet if the ETA of the (k+1)-th packet is not earlier than the time obtained by subtracting the arrangement limit time LT from the actual time of arrival CUR of the (k+1)-th packet.

The packet pointer buffer 344 may include a plurality of time slots that are allocated according to an ETA of each packet. The packet pointer buffer 344 may operate in a circular queue manner in which a start and an end of queues corresponding to the time slots are connected to each other.

The packet pointer buffer 344 may vary in size according to the capacity of memory, and in the example shown in FIG. 3, the packet pointer buffer 344 includes 16,384 time slots. A size of each time slot may also vary according to the capacity of memory. For example, a time slot may be generated in the packet pointer buffer 344 at intervals of 8 microseconds. In this example, the schedule input unit 342 may allocate a packet to the packet pointer buffer 344 according to an ETA of the packet at intervals of 8 microseconds.

The schedule output unit 346 may process the packets one by one, which are allocated by the schedule input unit 342 to the packet pointer buffer 344 according to bandwidth of the output link 20, and transmit the processed packet to the output link 20.

The packet scheduling apparatus 300 may be configured to perform an example of a packet scheduling method, and may also included various function blocks other than those set forth herein. As illustrated in the above examples, it is possible to effectively control unresponsive traffic, which is traffic that does not respond to congestion of traffic in a network, and fairly share bandwidth between flows by determining fair bandwidth for each flow and scheduling packets based on the determined bandwidth. Moreover, unlike in weighted fair queuing (WFQ), it is possible to effectively perform packet scheduling without requiring virtual time information and an array structure based on a time stamp that is calculated based on virtual time information, and that is allocated to each packet. Furthermore, unlike in frame-based scheduling, it is possible to effectively perform packet scheduling without requiring frame size adjustment and frame synchronization.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A packet scheduling method comprising:
calculating an expected time of arrival of a (k+1)-th packet subsequent to a currently input k-th packet of individual flows by use of bandwidth allocated fairly to each of the flows and a length of the k-th packet;
in response to the arrival of the (k+1)-th packet, comparing the expected time of arrival of the (k+1)-th packet to an actual time of arrival of the (k+1)-th packet; and scheduling the (k+1)-th packet of each flow according to the comparison result, wherein the scheduling of the (k+1)-th packet of each flow according to the comparison result comprises comparing the expected time of arrival of the (k+1)-th packet to a time obtained by subtracting a "rearrangement limit time" for the expected time of arrival from the actual time of arrival of the (k+1)-th if the expected time of arrival of the (k+1)-th packet of each flow is not later than the sum of the actual time of arrival of the (k+1)-th packet and a burst tolerance time, wherein the scheduling of the (k+1)-th packet of each flow according to the comparison result comprises discarding the (k+1)-th packet if the expected time of arrival of the (k+1)-th packet of each flow is later than the sum of the actual time of arrival of the (k+1)-th packet and a-the burst tolerance time.

2. The packet scheduling method of claim 1, wherein the comparing of the expected time of arrival of the (k+1)-th packet to the actual time of arrival of the (k+1)-th packet comprises comparing the expected time of arrival of the (k+1)-th packet to the sum of the actual time of arrival of the (k+1)-th packet and the burst tolerance time.

3. The packet scheduling method of claim 2, wherein the scheduling of the (k+1)-th packet of each flow comprises initializing the expected time of arrival of the (k+1)-th packet to the actual time of arrival of the (k+1)-th packet if the expected time of arrival of the (k+1)-th packet is earlier than the time obtained by subtracting the "rearrangement limit time" for the expected time of arrival from the actual time of arrival of the (k+1)-th, and calculating an expected time of arrival of the (k+2)-th packet subsequent to the (k+1)-th packet based on the calculated expected time of arrival of the (k+1) -th packet if the expected time of arrival of the (k+1)-th packet is not earlier than the time obtained by subtracting the "rearrangement limit time" from the actual time of arrival of the (k+1)-th packet.

4. The packet scheduling method of claim 1, wherein each of the flows is allocated bandwidth which is resulted from dividing total output link capacity by the number of all flows that share the link.

5. The packet scheduling method of claim 4, further comprising: fairly distributing bandwidth that is designated to the output link and unused in practice to all flows that share the output link.

6. The packet scheduling method of claim 1, wherein the calculating of the expected time of arrival of the (k+1)-th packet comprises calculating the expected time of arrival of the (k+1)-th packet by adding an expected time of arrival of the k-th packet and a value obtained by dividing a length of the k-th packet by bandwidth allocated to a flow of the k-th packet.

7. The packet scheduling method of claim 6, further comprising:

generating flow information with respect to an input packet and adding the flow information in a flow information storage unit when a flow of the input packet is a new flow whose flow information is not found in the flow information storage unit for storing information of at least one flow;

setting an expected time of arrival of the input packet to an actual time of arrival of the input packet; and calculating an expected time of arrival of a subsequent packet of the new flow using the set expected time of arrival.

8. A packet scheduling apparatus comprising:

an expected time of arrival calculating unit configured to calculate an expected time of arrival of a (k+1)-th packet subsequent to a currently input k-th packet of individual flows by use of bandwidth allocated fairly to each of the flows and a length of the k-th packet; and a packet scheduling unit configured to compare the expected time of arrival of the (k+1)-th packet to an actual time of arrival of the (k+1)-th packet in response to the arrival of the (k+1)-th packet and to schedule the (k+1)-th packet of each flow according to the comparison result and to compare the expected time of arrival of the (k+1)-th packet to a time obtained by subtracting a "rearrangement limit time" for the expected time of arrival from the actual time of arrival of the (k+1)-th if the expected time of arrival of the (k+1)-th packet of each flow is not later than a sum of the actual time of arrival of the (k+1)-th packet and a burst tolerance time, wherein the schedule input unit is further configured to discard the (k+1)-th packet if the expected time of arrival of the (k+1)-th packet is later than the sum of the actual time of arrival of the (k+1)-th packet and the burst tolerance time, wherein the expected time of arrival calculating unit and the packet scheduling unit run on one or more processors.

9. The packet scheduling apparatus of claim 8, further comprising: a flow information storage unit configured to store information of at least one flow, which includes the expected time of arrival of the (k+1)-th packet.

10. The packet scheduling apparatus of claim 9, wherein the expected time of arrival calculating unit is further configured to calculate the expected time of arrival of the (k+1)-th packet by adding an expected time of arrival of the k-th packet and a value obtained by dividing a length of the k-th packet by bandwidth allocated to a flow of the k-th packet.

11. The packet scheduling apparatus of claim 10, further comprising: an input processing unit configured to determine whether flow information of an input packet is found in the flow information storage unit that stores the information of at least one flow, wherein the input processing unit is further configured to generate flow information with respect to the input packet and add the flow information in the flow information storage unit when a flow of the input packet is a new flow whose flow information is not found in the flow information storage unit.

12. The packet scheduling apparatus of claim 9, wherein the expected time of arrival calculating unit is further configured to fairly distribute bandwidth that is designated to the output link and unused in practice to all flows that are managed by the flow information storage unit.

13. The packet scheduling apparatus of claim 8, wherein the packet scheduling unit is further configured to comprise a packet pointer buffer configured to include a plurality of time slots that are allocated according to expected times of arrival of packets, a schedule input unit configured to allocate the packets to each corresponding time slot of the packet pointer buffer, and a schedule output unit configured to transmit the packet allocated to the packet pointer buffer.

14. The packet scheduling apparatus of claim 13, wherein the schedule input unit is further configured to compare the expected time of arrival of the (k+1)-th packet to the sum of an actual time of arrival of the (k+1)-th packet and the burst tolerance time if an input packet is not a first packet of each flow.

15. The packet scheduling apparatus of claim 14, wherein the schedule input unit is further configured to initialize the expected time of arrival of the (k+1)-th packet to the actual time of arrival of the (k+1)-th packet if the expected time of arrival of the (k+1)-th packet is earlier than the time obtained by subtracting the "rearrangement limit time" for the expected time of arrival from the actual time of arrival of the (k+1)-th, and to calculate an expected time of arrival of the (k+2)-th packet subsequent to the (k+1)-th packet based on the calculated expected time of arrival of the (k+1)-th packet if the expected time of arrival of the (k+1)-th packet is not earlier than the time obtained by subtracting the "rearrangement limit time" from the actual time of arrival of the (k+1)-th packet.

16. The packet scheduling apparatus of claim 9, wherein the packet pointer buffer is further configured to operate in a circular queue manner in which a start and an end of queues corresponding to the time slots are connected to each other.

* * * * *